United States Patent
Choi

(10) Patent No.: US 7,949,337 B2
(45) Date of Patent: May 24, 2011

(54) SYSTEM AND METHOD FOR CELL RESELECTION IN A MOBILE COMMUNICATION NETWORK

(75) Inventor: Yoon Seok Choi, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 11/778,471

(22) Filed: Jul. 16, 2007

(65) Prior Publication Data

US 2008/0014944 A1 Jan. 17, 2008

Related U.S. Application Data

(63) Continuation of application No. 10/444,188, filed on May 23, 2003, now Pat. No. 7,630,718.

(30) Foreign Application Priority Data

May 30, 2002 (KR) .................................. 2002-30356

(51) Int. Cl.
*H04Q 7/20* (2006.01)

(52) U.S. Cl. ........ 455/440; 455/436; 455/437; 455/439; 455/441; 455/443

(58) Field of Classification Search .................. 455/436, 455/442, 439, 440, 437, 438, 441, 443, 444
See application file for complete search history.

(56) References Cited

U.S. PATENT DOCUMENTS

| | | | |
|---|---|---|---|
| 5,530,910 A | 6/1996 | Taketsugu | |
| 6,052,598 A | 4/2000 | Rudrapatna et al. | |
| 6,178,326 B1 | 1/2001 | Kalliokulju | |
| 6,330,446 B1 | 12/2001 | Mori | |
| 6,400,951 B1 | 6/2002 | Vaara | |
| 6,510,146 B1 | 1/2003 | Korpela et al. | |
| 6,529,734 B1 | 3/2003 | Lagneborg et al. | |
| 6,564,057 B1 | 5/2003 | Chun et al. | |
| 6,721,567 B1 | 4/2004 | Wang et al. | |
| 6,847,822 B1 | 1/2005 | Dennison et al. | |
| 7,006,470 B1 * | 2/2006 | Wang et al. | 370/331 |
| 7,065,353 B1 * | 6/2006 | Bolinth et al. | 455/426.1 |
| 2001/0031638 A1 * | 10/2001 | Korpela et al. | 455/449 |
| 2002/0027889 A1 * | 3/2002 | Yun et al. | 370/331 |
| 2002/0032032 A1 | 3/2002 | Haumont et al. | |
| 2002/0037726 A1 * | 3/2002 | Czaja et al. | 455/442 |
| 2002/0057667 A1 * | 5/2002 | Hamalainen et al. | 370/347 |
| 2002/0105927 A1 | 8/2002 | Holma et al. | |
| 2002/0151308 A1 * | 10/2002 | Baba et al. | 455/446 |
| 2002/0187784 A1 | 12/2002 | Tigerstedt et al. | |

(Continued)

FOREIGN PATENT DOCUMENTS

CN 1261510 7/2000

(Continued)

*Primary Examiner* — Patrick N Edouard
*Assistant Examiner* — Fred A Casca
(74) *Attorney, Agent, or Firm* — Lee, Hong, Degerman, Kang & Waimey

(57) ABSTRACT

A system and method for cell reselection in a radio communication network is provided. The system comprises a mobile terminal transmitting a receive signal strength list after measuring signal strengths of at least a neighbor cell; and a host system selecting a cell suitable for the mobile terminal based on a suitable cell list and the receive signal strength list and transmitting the cell reselection information to the mobile terminal. The suitable cell list comprises information representing whether or not the neighbor cell is suitable for selection by the mobile terminal.

6 Claims, 5 Drawing Sheets

U.S. PATENT DOCUMENTS

| | | | |
|---|---|---|---|
| 2002/0193111 | A1 | 12/2002 | Wallstedt et al. |
| 2002/0196755 | A1* | 12/2002 | Hidaka et al. ................. 370/335 |
| 2003/0114158 | A1 | 6/2003 | Soderbacka et al. |
| 2004/0058678 | A1* | 3/2004 | deTorbal ....................... 455/437 |

FOREIGN PATENT DOCUMENTS

| | | |
|---|---|---|
| KR | 1020020012418 A | 2/2002 |
| WO | 99/01005 A1 | 1/1999 |
| WO | 00/16581 A1 | 3/2000 |

* cited by examiner

FIG. 2

| KIND OF SERVICE | DATA TRANSFER RATE | CELL LAYER |
|---|---|---|
| VOICE | 12.2Kbps | 1 |
| DATA | 64Kbps | 1 |
| | 128Kbps | 2 |
| | 144Kbps | 3 |
| | 256Kbps | 4 |
| | 384Kbps | 5 |
| | 2Mbps | 6 |
| VIDEO | 64Kbps | 1 |
| | 128Kbps | 2 |
| | 144Kbps | 3 |
| | 256Kbps | 4 |
| VOD | 384Kbps | 5 |
| | 2Mbps | 6 |
| ... | ... | |

FIG. 3

| KIND OF SERVICE | CELL LAYER |
|---|---|
| VOICE | 1 |
| DATA | 2 |
| VIDEO TELEPHONY | 3 |
| HIGH SPEED DATA | 4 |

FIG. 4

| RECEIVE SIGNAL STRENGTHS OF NEIGHBOR CELLS | |
|---|---|
| CELL A | −90dBm |
| CELL B | −60dBm |
| CELL C | −100dBm |
| CELL D | −59dBm |
| CELL E | −55dBm |
| CELL F | −93dBm |
| CELL G | NOT REACHABLE |
| CELL H | NOT REACHABLE |
| CELL I | NOT REACHABLE |

FIG. 5

| SUITABLE CELL LIST FOR MOBILE TERMINAL ||
|---|---|
| CELL A | SUITABLE |
| CELL B | SUITABLE |
| CELL C | SUITABLE |
| CELL D | NON-SUITABLE |
| CELL E | NON-SUITABLE |
| CELL F | SUITABLE |
| CELL G | SUITABLE |
| CELL H | SUITABLE |
| CELL I | SUITABLE |

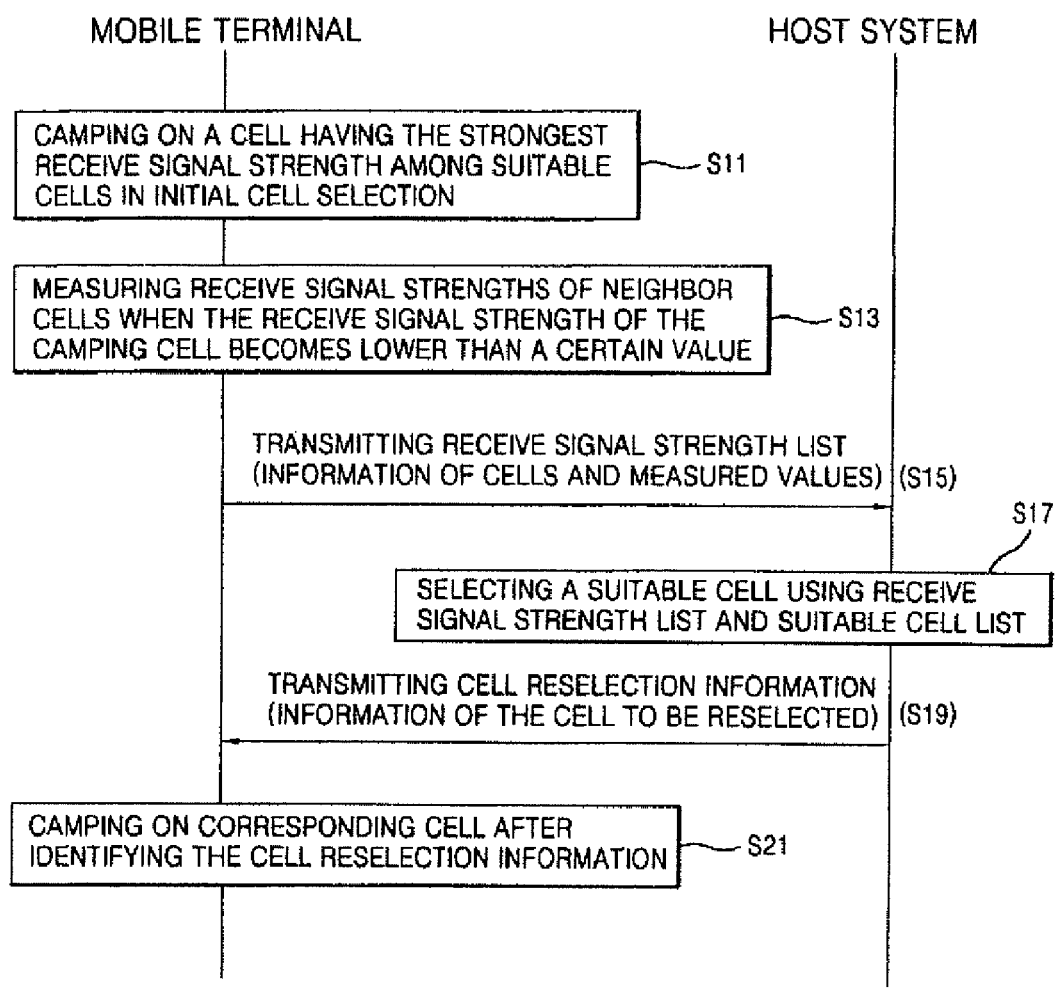

SYSTEM AND METHOD FOR CELL RESELECTION IN A MOBILE COMMUNICATION NETWORK

CROSS REFERENCE TO RELATED APPLICATION

This application is a continuation of U.S. application Ser. No. 10/444,188, filed on May 23, 2003, now U.S. Pat. No. 7,630,718, which claims the benefit of earlier filing date and right of priority to Korean Application No. 10-2002-0030356, filed on May 30, 2002, the contents of which are hereby incorporated by reference herein in their entirety.

BACKGROUND OF THE INVENTION

1. Field of the Invention

The present invention relates to a cell reselection, and particularly, to systems and methods for reselecting a cell in a radio communication network.

2. Description of the Background Art

Generally, a radio communication network has a hierarchical cell structure (HCS) in order to receive more subscribers and to provide various services. Kinds of services supported by the cells on respective layers can be divided according to service quality and data rate.

When a cell reselection is required in a HCS radio communication network, the cell is reselected as follows, according to the conventional method. When a neighbor cell satisfying a cell reselection criteria is found, a mobile terminal sets up primary common control channel (P-CCPCH) transmitted from a base station of the neighbor cell and receives system information from the set-up P-CCPCH. The mobile terminal decides whether or not the neighbor cell is suitable for selection based on the received system information. The mobile terminal selects the neighbor cell, if the neighbor cell is be suitable for the mobile terminal.

However, if the neighbor cell is not suitable for the mobile terminal, the mobile terminal determines if another neighbor cell is suitable. That is, the mobile terminal sets up P-CCPCH transmitted from another neighbor cell and receives system information from the set-up P-CCPCH. The mobile terminal decides whether or not the other neighbor cell is suitable for the mobile terminal based on the received system information. If the second neighbor cell is not suitable for the mobile terminal, the mobile terminal continues searching for another cell.

In a radio communication network, a neighbor cell having the largest receive signal strength has a lower probability of being the cell suitable for a corresponding mobile terminal. Therefore, in the conventional cell reselection method, the P-CCPCH set up and analysis of the system information from the P-CCPCH is repeated until the suitable cell is found. Thus, in the conventional cell reselection method the load for cell reselection of the mobile terminal is increased. This results in cell reselection taking much time, and reduction in efficiency of cell reselection.

SUMMARY OF THE INVENTION

In accordance with one or more embodiments of the invention, a system for cell reselection in a radio communication network is provided. The system comprises a mobile terminal transmitting a receive signal strength list after measuring signal strengths of at least a neighbor cell; and a host system selecting a cell suitable for the mobile terminal based on a suitable cell list and the receive signal strength list and transmitting the cell reselection information to the mobile terminal.

The suitable cell list comprises information representing whether or not the neighbor cell is suitable for selection by the mobile terminal. The suitable cell list is managed by the host system based on a specification of the mobile terminal, kind of service subscribed by the mobile terminal, and data transfer rate subscribed by the mobile terminal.

The host system manages information on the suitable cell list based on moving information associated with the mobile terminal. The receive signal strength list comprises information about the signal strength of a plurality of cells neighboring a cell on which the mobile terminal is camping.

In accordance with one embodiment, a method for cell reselection in a radio communication network comprises, transmitting a receive signal strength list comprising measured receive signal strength of at least one cell neighboring a cell on which a mobile terminal is camping to a host system; and receiving information about a neighboring cell selected from said signal strength list, wherein said neighboring cell has the strongest signal strength according to information in the signal strength list and said neighboring cell is included in a suitable cell list.

A mobile terminal manages the signal strength list. A host terminal manages the suitable cell list. A mobile terminal camps on the selected cell. The suitable cell list comprises information representing whether or not at least a neighbor cell is suitable for a mobile terminal and is managed by a host system based on information comprising at least one of a specification of a mobile terminal, service kinds associated with the mobile terminal, and data transfer rate associated with the mobile terminal.

In some embodiments, moving information representing mobility of a mobile terminal is transmitted to a host system. The host system updates information in the suitable cell list based on the moving information. The moving information is provided by a user of the mobile terminal. Alternatively, the moving information may be calculated based on location registration information of a mobile terminal with a host system.

In some embodiments, the radio communication network has a hierarchical cell structure comprising a plurality of cell layers, wherein a cell layer can be classified by the specification of the mobile terminal, kinds of service, and data transfer rate.

In accordance with yet another embodiment, the method of switching from a first cell to a second cell in a mobile communication network comprises receiving information about signal strength of a first plurality of cells, where said first plurality of cells are neighbors of the first cell on which a mobile terminal is camping; selecting the second cell from a second plurality of cells, wherein the second cell has the strongest signal strength and can provide services subscribed to by the mobile terminal.

A first list maintained by the mobile terminal comprises the information about signal strength of the first plurality of cells. A second list maintained by a host system comprises information about suitability of the second plurality of cells for the mobile terminal. Suitability of the second plurality of cells depends on specification of a mobile terminal, service kinds associated with the mobile terminal, and data transfer rate associated with the mobile terminal.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is an exemplary data transfer rate table, in accordance with one embodiment;

FIG. 3 is an exemplary service classification table, in accordance with one embodiment;

FIG. 4 is an exemplary signal strength table, in accordance with one embodiment;

FIG. 5 is an exemplary suitable cell table, showing an example of suitable cells for a mobile terminal, in accordance with one embodiment of the invention; and FIG. 6 illustrates the cell reselection operations between a mobile terminal and a host system, in accordance with one or more embodiments.

Features, elements, and aspects of the invention that are referenced by the same numerals in different figures represent the same, equivalent, or similar features, elements, or aspects in accordance with one or more embodiments of the system

DETAILED DESCRIPTION OF THE PREFERRED EMBODIMENTS

Figure 1:
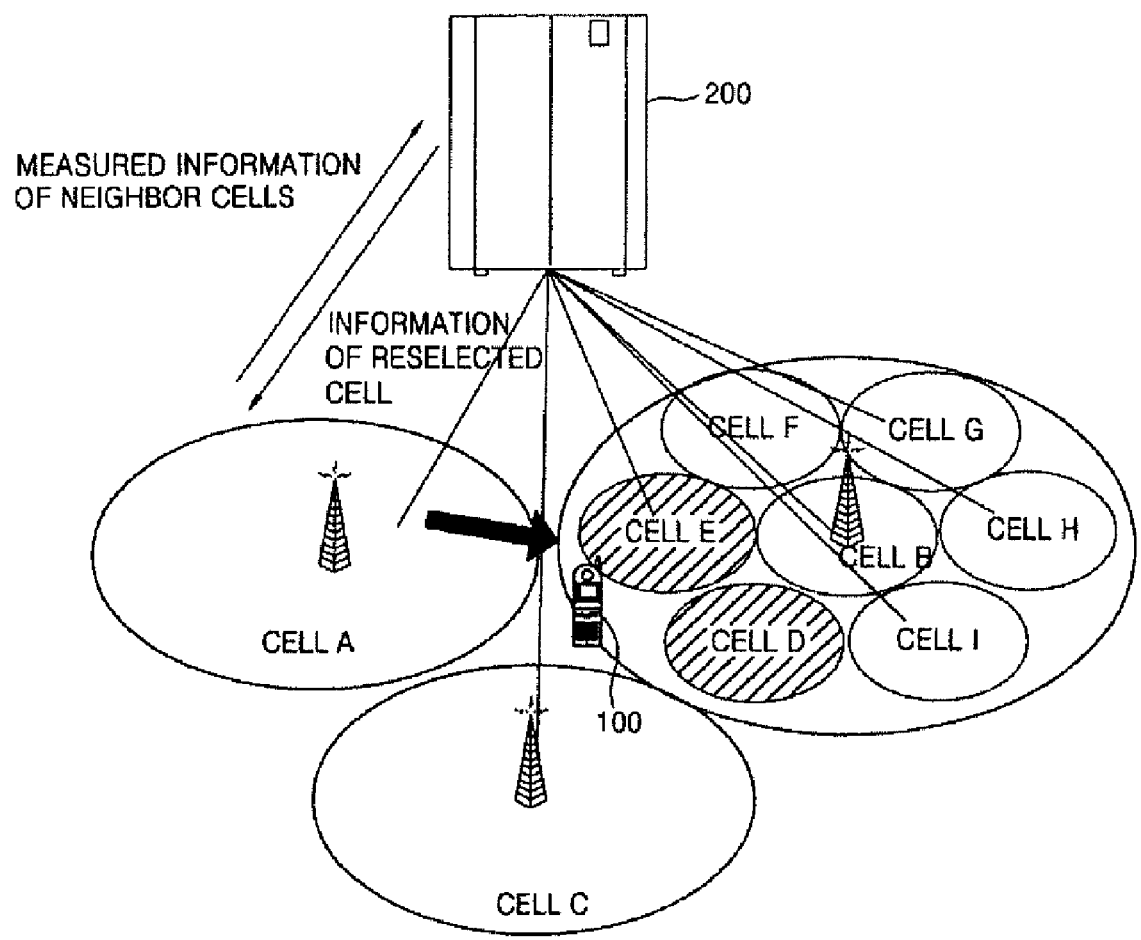
FIG. 1 is a diagram of a system for reselecting a cell in a radio communication network, according to an embodiment of the invention.

Referring to FIG. 1, the system for cell reselection in a radio communication network according to an embodiment of the present invention comprises a mobile terminal 100 for transmitting a receive signal strength list after measuring signal strengths from neighbor cells and performing cell reselection according to received cell reselection information. The system further comprises a host system 200 for searching a cell suitable for the mobile terminal 100, and transmitting cell reselection information, including information of the searched cells, to the mobile terminal 100.

In a hierarchical radio communication network, for example, the number of respective hierarchical layers can be set and service supported by the cells on the respective layers can be classified by data transfer rates provided in FIG. 2. The cells on the respective layers can also be classified by the type of service, as shown in FIG. 3.

When data transfer rate is high, the mobile terminal 100 preferably camps on a cell of small radius, for example. When mobility is high, the mobile terminal 100 preferably camps on a cell of large radius, for example. When a user subscribes to a certain radio communication provider in order to use the mobile terminal 100, the user (subscriber) can select various kinds of services and data transfer rates. The type of service and the data transfer rate can be different from specifications of the mobile terminal 100. In some embodiments, the information about the type of services subscribed by the user and the data transfer rate are stored and managed, for example, in a host system (200).

The host system 200 manages information about cell layers suitable for the mobile terminal 100 and cell layers not suitable for the mobile terminal 100. A suitable cell list is determined based on registration information of the mobile terminal 100 and information about the service kinds and the data transfer rates. A mobile terminal 100 subscribing to a voice service, a data service and a video telephony service, for example, is shown in FIG. 3 in accordance to one or more embodiments.

The user of mobile terminal 100 is provided with services by first layer cells, second layer cells and third layer cells. The mobile terminal 100 may subscribe to a voice service of 12.2 Kbps, a data service of 64 Kbps, a data service of 128 Kbps, and a video service of 128 Kbps, for example. These services can be provided by the first layer cells and second layer cells, as shown in FIG. 2.

The mobile terminal 100, in one embodiment, comprises a moving information key representing information about moving speed. When the user of the mobile terminal 100 provides the moving information, the host system 200 changes information of suitable cell list of the mobile terminal 100, so that the mobile terminal 100 can be provided with services by the cells, with larger radius. The mobile terminal 100 can be provided with services by the cells of the layer including the cells of larger radius as the mobility of the mobile terminal is determined.

Referring to FIG. 6, in one embodiment, the mobile terminal 100 camps on a cell which has the strongest receive signal strength and is suitable for the mobile terminal in initial cell selection. For example, if the cells of a layer including cell A are suitable for the mobile terminal 100 and the receive signal strength from the cell A is the strongest, the mobile terminal 100 camps on the cell A (S11).

When the mobile terminal 100 moves, the strengths of the receive signals for the respective cells change. When the strength of the receive signal from cell A becomes lower than a certain value, the mobile terminal 100 measures receive signal strengths of cells neighboring the cell A (S13), in accordance with one embodiment.

Referring to FIG. 4, the mobile terminal 100, in some embodiments, transmits a receive signal strength list to the host system 200 (S15). The list comprises information about the measured receive signal strengths of neighbor cells and information of respective cells to the host system 200. The host system 200 searches for a cell suitable for the mobile terminal 100, using the suitable cell list in the host system 200, and the receive signal strength list transmitted from the mobile terminal 100 (S17).

Referring to FIG. 4, the strength of receive signal from cell E is the largest, for example. Cell D and cell B have the second and third strongest signals. FIG. 5 shows an example of a suitable cell list, representing whether or not neighbor cells of cell A on which the mobile terminal 100 camps are suitable. As shown, cell B and cell C are suitable for the mobile terminal 100, and cell D and cell E are not suitable, for example.

Accordingly, in one embodiment, the host system 200 selects cell B which has a larger receive signal strength and is suitable for the mobile terminal 100, and transmits the information of cell B as cell reselection information to the mobile terminal 100. Thus, the mobile terminal 100 after receiving the cell reselection information camps on cell B, for example.

When the subscriber inputs the moving information key for the mobile terminal 100, the host system 200 changes information of the suitable cell list of the mobile terminal 100, accordingly. When mobile terminal 100 needs to go through a cell reselection process the receive signal strength list is transmitted from the mobile terminal 100 to the host system 200. Then, host system 200 selects the most suitable cell for the mobile terminal 100, using the receive signal strength list and the changed suitable cell list. The host system 200 transmits information of the selected cell to the mobile terminal 100. Mobile terminal 100 camps on that cell using the information of selected cell.

The moving information of the mobile terminal 100 can be provided through the moving information key on the mobile terminal 100 by the subscriber and transmitted to the host system 200. Also, the moving information of the mobile terminal 100 can be retrieved by the host system 200, according to the changes of location registration information of the mobile terminal 100.

The host system 200 can collect registration information (e.g., terminal specification, service kinds, data transfer rate, etc.) of the mobile terminal 100. Host system 200 also can manage suitable cell list for the mobile terminal 100, based on the collected registration information.

In one embodiment, when the receive signal strength list of neighbor cells is transmitted from the mobile terminal 100 during cell reselection, the host system 200 selects a suitable cell from the suitable cell list and the receive signal strength list. The host system 200 then notifies the mobile cell 100 of the suitable cell, and thereby, the mobile cell 100 is able to perform the cell reselection easily and rapidly. Thus, according to the present invention, a suitable cell is selected by the host system based on terminal specification and the present cell planning. As such, the time for cell reselection is reduced.

According to one embodiment of the invention, the receive signal strengths of the neighbor cells are measured during reselection and transmitted to the host system 200. The mobile terminal 100 camps on the cell selected by the host system 200. As such, load of the mobile terminal for the cell reselection in the radio communication network of hierarchical cell structure (HCS) can be reduced. According to the present invention, the efficiency of cell reselection is improved as the HCS of the radio communication network becomes complex.

Embodiments of the invention are described by way of example as applicable to systems and corresponding methods that provide a more efficient cell reselection system in a cellular communication system. In this exemplary embodiment, logic code for performing these methods may be implemented in the form of, for example, application software. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type.

Software embodying the present invention may comprise computer instructions in any form (e.g., ROM, RAM, magnetic media, punched tape or card, compact disk (CD) in any form, DVD, etc.). Furthermore, such software may also be in the form of a computer signal embodied in a carrier wave.

Accordingly, the present invention is not limited to any particular platform, unless specifically stated otherwise in the present disclosure.

Thus, methods and systems for reselecting a cell in a cellular communication network are provided. The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A cell reselection method in which a host system provides a mobile terminal with information about a most suitable cell on which to camp, the method comprising:

performing, by the mobile terminal, a cell selection by camping on a cell which has the strongest receive signal strength among a plurality of neighboring cells after measuring signal strength of the plurality of neighboring cells;

transmitting, by the mobile terminal, registration information to the host system, wherein the host system maintains a list of cells that are suitable for the mobile terminal to camp on based on the registration information provided by the mobile terminal, the list of cells including suitable cells and unsuitable cells, wherein the registration information comprises information about at least terminal specification, a service type or a data transfer rate associated with the mobile terminal, wherein the host system retrieves moving information of the mobile terminal according to changes in the registration information of the mobile terminal at predetermined time intervals, wherein the host system, in response to retrieving the moving information, updates the list of cells such that a most suitable cell for the mobile terminal is identifiable when a cell reselection request is received from the mobile terminal;

scanning, by the mobile terminal, one or more cells neighboring the cell on which the mobile terminal is camping to determine respective signal strength of one or more neighboring cells when the mobile terminal is moved;

transmitting, by the mobile terminal, the cell reselection request comprising identity and signal strength data for the neighboring cells to the host system, in response to determining that signal strength of the cell on which the mobile terminal is camping has fallen below a threshold;

receiving, by the mobile terminal, a list comprising identity data for a target cell on which the mobile terminal is to camp from the host system, wherein the host system selects the most suitable cell for the mobile terminal as the target cell based on the updated list of cells.

2. The method of claim 1, wherein the host system stores information about a signal radius supported by the neighboring cells.

3. The method of claim 1, wherein the moving information of the mobile terminal is provided to the host system by a moving information key of the mobile terminal.

4. The method of claim 3, wherein the moving information is stored in a table in the host system.

5. The method of claim 1, wherein a neighbor cell with a larger radius is selected as the most suitable cell from the list of cells, if the moving information indicates that the mobile terminal is moving at a speed higher than a threshold.

6. The method of claim 1, wherein a neighbor cell with a smaller radius is selected as the most suitable cell from the list of cells if the data transfer rate for the mobile terminal is higher than a threshold.

* * * * *